(12) United States Patent
Kolomeitsev et al.

(10) Patent No.: US 10,432,681 B1
(45) Date of Patent: *Oct. 1, 2019

(54) METHOD AND SYSTEM FOR CONTROLLING LOCAL DISPLAY AND REMOTE VIRTUAL DESKTOP FROM A MOBILE DEVICE

(71) Applicant: Parallels International GmbH, Schaffhausen (CH)

(72) Inventors: Artem Kolomeitsev, Moscow (RU); Alexander Kiselev, Moscow (RU); Nikolay N. Dobrovolskiy, Moscow (RU); Stanislav S. Protassov, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 350 days.

This patent is subject to a terminal disclaimer.

(21) Appl. No.: 15/298,176

(22) Filed: Oct. 19, 2016

Related U.S. Application Data (63) Continuation of application No. 14/256,552, filed on Apr. 18, 2014, now Pat. No. 9,485,290.

(60) Provisional application No. 61/815,323, filed on Apr. 24, 2013.

(51) Int. Cl.
*H04L 29/06* (2006.01)
*H04L 29/08* (2006.01)

(52) U.S. Cl.
CPC ........ *H04L 65/4092* (2013.01); *H04L 65/604* (2013.01); *H04L 67/125* (2013.01)

(58) Field of Classification Search
CPC .. H04L 65/4092; H04L 65/604; H04L 67/125
See application file for complete search history.

(56) References Cited

U.S. PATENT DOCUMENTS

| | | | |
|---|---|---|---|
| 5,844,553 A | 12/1998 | Hao et al. | |
| 7,590,744 B2 | 9/2009 | Richardson et al. | |
| 7,949,730 B2 * | 5/2011 | Rensin | H04L 29/06027 341/176 |
| 8,271,675 B2 | 9/2012 | Oh et al. | |
| 8,539,039 B2 | 9/2013 | Sheu et al. | |
| 8,660,530 B2 * | 2/2014 | Sharp | H04L 67/125 455/411 |

(Continued)

*Primary Examiner* — Moustafa M Meky
(74) *Attorney, Agent, or Firm* — Lowenstein Sandler LLP (57) ABSTRACT

A computer-implemented method for transmitting and controlling images of a remotely executed application, the method including connecting a mobile computing device to a remote server; connecting a desktop computing device to the remote server and to the mobile computing device; starting an application on the remote server, wherein the application generates graphical objects controllable by commands from the mobile computing device; encoding each graphical object into a video stream; transferring the video stream to the mobile computing device and to the desktop computing device; generating the commands on mobile computing device; sending the commands to the remote server; detecting if the video stream contains results of execution of the commands; displaying the graphical objects on the local computing device; and generating an image of a substitute graphic object image if the video stream does not contain the results.

20 Claims, 7 Drawing Sheets

(56) References Cited

U.S. PATENT DOCUMENTS

| | | | |
|---|---|---|---|
| 9,077,843 B2 * | 7/2015 | Yu | H04N 9/12 |
| 9,304,662 B2 | 4/2016 | Beveridge | |
| 9,485,290 B1 * | 11/2016 | Kolomeitsev | H04L 65/60 |
| 9,542,080 B2 | 1/2017 | Beveridge et al. | |
| 9,773,226 B2 | 9/2017 | Kang | |
| 9,984,203 B2 | 5/2018 | Westin et al. | |
| 2008/0177638 A1 * | 7/2008 | Butler | G06F 8/38 |
| | | | 705/26.41 |
| 2010/0106766 A1 | 4/2010 | Bailey et al. | |
| 2010/0279673 A1 * | 11/2010 | Sharp | H04L 67/125 |
| | | | 455/419 |
| 2011/0211212 A1 | 9/2011 | Berard et al. | |
| 2011/0249024 A1 | 10/2011 | Arrasvuori et al. | |
| 2011/0314093 A1 | 12/2011 | Sheu et al. | |
| 2012/0028707 A1 | 2/2012 | Raitt et al. | |
| 2012/0206268 A1 | 8/2012 | Morris | |
| 2012/0229397 A1 | 9/2012 | Cho et al. | |
| 2013/0215018 A1 | 8/2013 | Xu et al. | |
| 2013/0290857 A1 | 10/2013 | Beveridge | |
| 2014/0013234 A1 | 1/2014 | Beveridge et al. | |
| 2014/0168056 A1 | 6/2014 | Swaminathan et al. | |
| 2014/0258880 A1 | 9/2014 | Holm et al. | |
| 2015/0121193 A1 | 4/2015 | Beveridge et al. | |
| 2015/0363368 A1 | 12/2015 | Zhang et al. | |
| 2016/0148042 A1 | 5/2016 | Gonion et al. | |

\* cited by examiner

METHOD AND SYSTEM FOR CONTROLLING LOCAL DISPLAY AND REMOTE VIRTUAL DESKTOP FROM A MOBILE DEVICE

CROSS-REFERENCE TO RELATED APPLICATIONS

This application is a continuation of U.S. application Ser. No. 14/256,552, filed Apr. 18, 2014, which claims priority to U.S. Provisional Patent Application No. 61/815,323, filed on Apr. 24, 2013, and is related to U.S. patent application Ser. No. 13/803,019, filed on Mar. 14, 2013, all of which are incorporated by reference herein in their entirety.

BACKGROUND OF THE INVENTION

Field of the Invention

The present invention relates to remote computer access, and more particularly, to a method and system for controlling a desktop application remotely from a mobile device.

Description of the Related Art

The industry trend of using mobile devices and various tablets presents some challenges with regard to remote access to desktop/laptop computers. For example, a user wants to open an application on a remote desktop of a computer from his mobile device. However, the application window, or some representation of its contents, has to be delivered to the mobile device in real time. This presents a problem in the existing systems, where the client receives a message about a new contents of the application window, but only can see old images that do not correspond to the current contents of the remote application windows. In other words, the remote desktop contents are not synchronized with what is shown on a mobile device, which cause delays in rendering images (applications windows) on the mobile device.

For example, U.S. Pat. No. 6,020,901 describes a typical video data processing system. In such a system a frame buffer is not available to system processes in real time. This system has a problem with synchronization of captured video frames (images) with images rendered on the screen in real time. Thus, one problem is minimizing delay between two moments in time—when a frame was originally displayed on the remote host and when the received frame is displayed on the mobile device. This delay must be minimal to produce a real-time experience. Another problem is capturing all video frames that need to be displayed on a remote user device. And another problem is a loss of some video frames during transmission.

Thus, if a user wants to work with an application executed remotely on a host computer from his mobile device, there are significant difficulties in using the application in real time due to delays in transferring video stream over a network.

Accordingly, a system for remote access to host applications from a mobile device in real-time is desired.

SUMMARY OF THE INVENTION

The present invention is related to a method and system for working with the applications on the computer screen accessible remotely by a mobile device that substantially overcomes the disadvantages of the related art.

In one aspect, a method for using a mobile device as a remote control of a remote desktop connected to a host is provided. A local computer is connected to a remote server (host) over a WAN and is connected to a mobile device over a LAN. The mobile device is used to control remote and local applications and remote and local images properties. Here, "remote" means running or placed on the host and "local" means running or placed on the local computer or mobile device. The applications are executed on a remote server and screen images are rendered on a local computer. However, the images are formed on the remote host as a result of execution of the remote applications.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

Brief Description of the Attached Figures

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

The present invention is related to a method and system for using a mobile device as remote control of a remote desktop connected to a host. A local computer is connected to a remote server over a WAN and is connected to a mobile device over a LAN. The mobile device is used to control applications and images. The applications are executed on a remote server and screen images are rendered on a local computer. However, the images are formed on the remote server as a result of execution of the applications. As an example, the game "Angry Birds" (which normally runs on an iPhone) will actually execute on the server, the display of the game is shown on a large-screen monitor of a local desktop computer, and the controls for the game are generated using the mobile device.

According to an exemplary embodiment, the mobile device forms commands for controlling the applications running on a remote server or on a cloud. The commands are: select an application, scroll the application window, change brightness, resolution, etc. The applications run on the remote server. The application execution results are provided to the local computer in a form of video streams. The application can reside on a remote server or on a cloud. The local host receives the application video stream and can send it to the mobile device without rendering it on the local host. Note that the mobile device and the local desktop both have a direct access to a remote server.

In one embodiment, the images formed on the remote server can be larger than a window rendered on the local computer screen or on the mobile device screen. In one embodiment, "virtualization" means creating a user experience of a locally executed application, but the application is running on a remote server or on a cloud.

The mobile device controls the remote application including positioning of the application window. The local host computer receives the commands over a local network isolated from WAN and filters the commands according to certain requirements. For example, some commands are related to the local computer, for example, windows switching, magnification factor, system settings, starting application or controlling a widget, and so on. Other commands are related to the remote server. Generally, commands causing a change in application state need to be sent to the remote server (e.g., a click on application interface button).

Other commands that do not cause changes in the state of the application can be processed on the local host (e.g., switching or moving application windows). The commands may be the same from the perspective of the user experience, but the commands may be addressed to certain computers on the server cluster or a cloud. According to the exemplary embodiment, the commands can have a special proprietary OS-independent format, which may be translated into a format of a given OS by an agent module implemented on the local host or on the remote server.

As an example, the local computer can use a more specific algorithm. For example, the selection commands may be passed to the remote server, but image selection can be performed on the mobile device and a locally selected image is used for displaying selection, while the selection is performed on the remote server. When the selection is reflected in the video stream received by local devices, such as a mobile device and/or a local desktop, the local image of the selection becomes superfluous. Note that the selection is copied to the clipboard on the server running application with corresponding data. In this case it is a remote server. Then the selected data can be transmitted to the mobile device and can be copied to the mobile device's clipboard. Note that images, text and files can be copied to the mobile device's clipboard in a format readable by the mobile device. The image selection can be made by detection of user eye positioning on the mobile device screen.

After specifying the action, the same operation may be passed on to the remote server, and clipboard data can be transmitted to the local computer after selection is finalized. As an example, when delay time is significant, brightness of an image can be changed locally at the same time as the corresponding command is transmitted to the remote server. When brightness is applied to the remote image being received on the local computer, the local brightness modification is cancelled. Alternatively, the brightness remains the same and the rotating circle (or a similar graphic indicating an action in progress) is displayed to a user until the current desktop image is received and rendered to the user.

In one embodiment, a selection of text or another object is performed on the client and the selection results are processed on the server, but the images reflecting the selection are formed on the client (i.e., local desktop) continuously and/or permanently. The selection may be performed in graphical form over a transmitted image on a mobile device screen or on a local host screen. For example, pointers indicating beginning and the end of the selection may be shown permanently, and color changes of the selected objects and the changes of the background color of the selected object are displayed on the client or on both local host and mobile device, but the images of the color changes are generated on the client until the remote server generates corresponding images and the images are received by the client.

Selection can be implemented with complete or partial object recognition, even if the object is blurry and cannot be recognized in detail, the general shape and position of the object provides a possibility of detecting the object's nature. For example, the object can be a letter, word, paragraph, line, icon, and so on. In this case, the selection indication in a form of changes of object color and background colors, and the shape of the selection, can be implemented in discrete steps. The selection can move in correspondence with the object's positions on the screen, while the user scrolls the image or the like. The objects may be letter(s) word(s), line(s), paragraph(s), icon(s) or other types of graphical primitives, and so on.

After completion, the data defining the selection, such as selection margins, may be sent to the server, either on a continuous basis or periodically, corresponding to the moments of changes of the selection and/or positioning of the text on the screen. In one embodiment, the local desktop or the mobile device tracks changes in position and size of the selection and the desktop/screen images on the user's device and transmits parameters of the selection to the remote server. In another embodiment, the codec embeds into the video data stream data indicating that the selection has been processed on the server side. Correspondingly, after receiving the message, the client has no need to process the whole selection image. However, some parts of the selection images, such as locations of the initial and final selection pointers (or "pins") can be generated only on the client/user side.

In another embodiment of the invention, the size of the pointers generated on the client may be scaled while the text or other selected objects size is changed as a result of zooming on the server or the client size. The pointers are a graphic implementation of the beginning and the end of the selections or other key points of selections. In other words, the size of the pointers may be determined by the parameters of image displayed on the mobile device or the local host screen. As an option, when the image is shown on different devices with different screen sizes and/or resolutions, each device can generate pointers with a suitable size for that display. As another option, the pointers may be magnified or reduced on the local display while the rest of the text stays unchanged.

The parameters of selection are initially formed and graphically represented on the client side. In this case, the selection may be formed in a simple graphical form such as rectangle with mobile corners or may be formed from discrete elements, or in discrete steps, using position of objects recognized in the image transmitted from the remote server. Here, pointers and selection can move object by object. The object may be letter, word, line, paragraph, icon, and so on.

In one embodiment, an improved algorithm may be implemented to detect or recognize different columns and/or pages in the image, and to separate content of pages from auxiliary information, such as formatting information like headers, footers, page and column numbers, and so on. If such recognition is successful, the visualization of the selection containing only required data may significantly improve user experience. Such an improvement may be required when the image is being scrolled at high speed.

If the recognition is not successful, the real selection view can be transmitted from the remote server after processing selection parameters received from the client side. If the selection is processed on the server and received by client, the client can stop forming the selection images. For this purpose, the software on the client side can send selection parameters along with IDs of frames used for selection. The remote server, in turn, stores parameters of windows transmitted to the client and then can combine the parameters with parameters of the selection to process user requests.

In one embodiment, the image from the video stream from the remote server can be recognized on the local desktop or on the mobile device. The areas containing userspecified or user-required areas are detected during the recognition process. For example, for the text objects, the borders of the paragraphs, the line borders, the borders of particular letters or words with or without certain meaning of words and letters, may be determined. Also punctuation marks and capital letter recognition may improve the user experience. In an alternative embodiment, the auxiliary information related to objects' border may be embedded to the video stream formed by codec during coding images.

In one embodiment, while some of the cursor functions are executed on the remote server, the actual cursor image can be generated and displayed locally. For example, a cursor position may be roughly determined on the mobile device using a touchscreen functions or cursor or directions control buttons and the cursor image and its exact location, for example, between letters can be determined by the local desktop. In one embodiment, the cursor can discretely move letter by letter, word by word, and so on. Alternatively, the cursor can move over other graphical objects.

Recognition is required for implementation of some of the user actions. For example, a user may want that a double click by him colors the selection for a paragraph, and movement of the cursor along the text line should select the line or a portion of the line.

In those cases, line and paragraph margins should be defined for successful operation. Note that the mobile device interface functions may be used for generation selections, cursors, pins, and so on, while (in addition to the mobile device) the local desktop or server may be used for computationally intensive functions required for object recognition. In one embodiment, the local desktop can be used only for computations, and the mobile device can send resulting parameters of the borders of the selected areas to the remote server, render the graphical data from video stream and images of the cursor, and so on.

As another option, some visual effects can be seen by the user when the connection is poor.

When user wants to change picture quality, for example, hue, saturation or color balance, the request may be simultaneously sent to the remote server and to the local desktop, or to a local control application controlling a local screen of the mobile device. Consequently, the required parameters are applied to the local picture on the desktop unless the coding procedures on the remote server provide the local device with the picture with required parameters.

In an exemplary embodiment, the codec can code each picture in a multi-level format. For example, LSBs (least significant bits) of the video stream data may define a picture in low quality, while the rest of bits or MSBs (most significant bits) define a data for improving picture quality (e.g., define a picture in additional points or in an improved color scheme). In yet another embodiment, each video frame can be represented by several network packets with redundancy. Each packet in this case contains a low quality portion of the frame as a redundant part for increase reliability of data transmission, and other data portions complement the redundant part and are used for description of a relatively high quality picture. When the data represents a picture in multilevel form, a mobile device or a local desktop can detect an eye position or a central axis of the user's view field (e.g., using the camera on the smartphone) and form a low quality image on the viewed screen, if the high quality image is not suitable or needed for user's peripheral vision.

For example, when a user focuses his eyes on the local desktop while using a mobile device as a control device, then the image on the mobile device can be rendered in low quality or it can be not displayed at all. If the user does not look directly at the desktop screen, the image can be displayed in low quality and so on. In one embodiment, if the user moves away from the screen, the quality of images on the entire screen can be reduced. When the user moves closer to the screen, the quality of central part of the screen image is increased, while the quality of other portions of the screen located within user's peripheral vision is decreased even more. Thus, on average, the screen can use low quality of images, which saves traffic while providing a user with a good image representation and good user experience.

According to an exemplary embodiment, the codec can be used as the only interface for sending the visual data from the server to the client. In other words, the video data in form of bytes of pixels of the entire image is not formed, and all the pixels' data is not transferred. The image is described partially by a graphic data and partially by a description of areas and their behavior. Critical data is coded into a graphical format to ensure that transmission errors cannot corrupt data entirely.

In one embodiment, separate applications are located on different computers of a network cluster and use different graphic shells or video cards and different hardware desktops. Such network structures may be used for providing the "leased" or "rented" applications and for disk space. The workspace may also be assembled from all local devices used in a highly optimized manner—the server is used for calculations, the display is used for rendering graphics, and the mobile device is used for control.

In one embodiment, the codec can code a picture from the remote server in several divided different portions or parts. Then the parts may be used by local devices. For example, the mobile device displays parts of the interface that can be easily viewed on the mobile device, e.g., without any extra elements. The workspace and tools can be displayed on the mobile device, while the desktop can display a central portion without the tools. The tools may then be moved from the screen edges to the central zone without the text indicated on the mobile device and the local desktop screen can display the entire screen with the text and the tools.

In another embodiment, the tools or the entire windows may be "tossed" from the mobile device to the local desktop by the finger movement toward desktop or to the trash bin by other predefined movement of the user finger. In yet another embodiment, the user can use separate areas of the desktop as targets for applying the tools, where the tool may be a colorize tool, a text capitalizing tool or any area-specific tool. The position detecting means of the mobile device and video cameras of the mobile device and local desktop can help properly aim the mobile device in the process. As yet another option, the target position, for the movement of the tools or graphics from the mobile device to the local desktop, may be shown on the local desktop screen.

According to one exemplary embodiment, some mobile device commands (or truncated or transmitted commands) are executed on the local computer and some mobile device commands (or truncated or transmitted commands) are sent over the WAN or LAN to the remote server. The local computer can form additional control commands based on application control logic and state of the network for controlling the applications, codec and network traffic. As another option, all the hardware entities involved—the mobile device, the local desktop, the remote server—have a set of control commands related to the common tasks and perform corresponding actions to provide the best result on the desktop or on the mobile device, if a desktop is switched off. If a command can be executed on the mobile device or on the remote server, it is executed on the mobile device or is sent to the remote server.

Otherwise, the command is sent to a local desktop and is processed there. In one embodiment, the command can be executed on the local desktop and simultaneously sent to the remote server and the execution of the command on the local desktop is terminated when the results of the command execution on the remote server reach the local desktop. According to the exemplary embodiment, the service for command processing runs on the mobile device and uses interfaces and the additional services on the local desktop and on the remote server.

For example, if a user performs a zoom gesture on the mobile device screen, the application on the mobile device can process this command and zoom in or out the current picture on the local desktop accordingly. The commands are executed on-the-fly and the user has an experience as if all of the commands were executed locally.

According to one exemplary embodiment, a graphic state, such as the values of hue, saturation, contrast, resolution, opaqueness, and positioning of different portions of the window may be controlled in several ways. In this case, frequent updates of key frames or abrupt image changes are minimized. The traffic from the codec is sent in a form of differential signals. The differential signals represent a difference between the consecutive video frames.

The issue here is a "signal" data related to the adjacent frames changing. If changes are significant or losses in subsequent frames are significant, the key frame is generated and transmitted. The key frame contains a full image in as good as possible resolution. The key frame may also have poor quality for traffic optimization, and the following data can improve the quality of the overall video stream. The key frames are produced by the transport layer. Note that the exemplary embodiment can be implemented without the use of key frames if a lower resolution is acceptable in the areas of the screen not directly viewed by the user. Special metadata can be sent along with a frame for rendering application windows on the mobile device.

According to the exemplary embodiment, window frames are sent once. The actual windows on the remote server are formed in a larger size than the one required for rendering on the local computer. Thus, if a user moves the window slightly, the commands are not sent to the remote server. Instead, the image in the window is moved on the local computer or mobile device by changing a position of the window frame.

However, if the user actions cause moving outside of the window on the local computer, the commands are transmitted to the remote server and the window dimensions and position are changed accordingly. Note that each window can be controlled in a separate mode. One window can contain an editor tool panel and another can contain the content to be edited.

In this case, the editor tool panel can be fully loaded onto a local desktop and the scrollable content can be rendered inside a different window (frame). The scrollable content can be loaded into a buffer of the local computer as a single frame. The difference can be formed only for a part being edited. In one embodiment, new key frames are formed only when the edited content is changed. According to another exemplary embodiment, if network packet traffic speed changes, the local desktop optimizes the images on-the-fly without user commands and input. The changes in the traffic speed may be detected by network interfaces of the devices. If a delay between the point when the client data is ready, and the time when the client receives the data exceeds a certain threshold, or there are many lost packets during transmission, the server determines that the channel is overloaded and reduces the quality of transported images (frames). If the delay is stable and not the longest acceptable, the server may add empty data into the traffic. If the delay still remains stable, the server increases the quality of the transported images.

For example, if a portion of the window invisible to the user requires a lot of traffic, the size of the frame formed on the server is reduced. In particular, the edge artifacts are reduced if the frame size is larger than the window. Another example is scrolling, which requires changing the size of the frame. The codec can encode images using high and low resolution depending on independent portions of a video stream.

Figure 1:
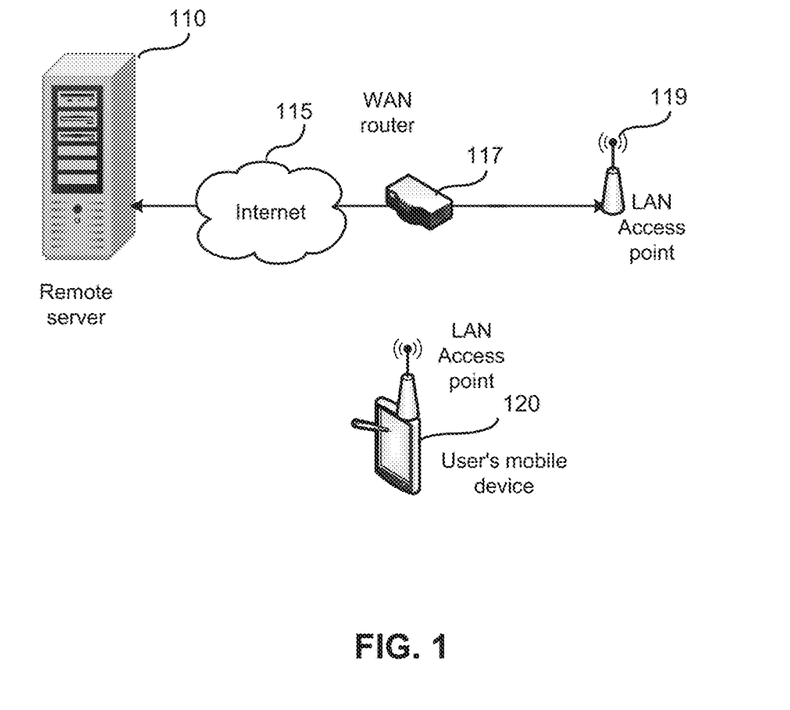
FIG. 1 illustrates a general infrastructure, in accordance with the exemplary embodiment.

According to the exemplary embodiment, the mobile device controls the remote application including positioning of the application window. The local computer receives the commands over a local network isolated from WAN and filters the commands according to certain requirements as shown in FIG. 1. Note that one of the devices has an external IP address or all of them are connected through a dedicated server. The control signals are transmitted to a server 110, which uses the commands for forming images. A user mobile device 120 is connected to the server 110 over the Internet 115 via a LAN access point 119 connected to a router 117.

Some commands are used locally for configuration of images on the screen. For example, the image can be scrolled locally. According to the exemplary embodiment, an image capturing subsystem is synchronized with a subsystem collecting open windows related data. Generally, there are several subsystems, such as for frame capture, receiving information about applications that are running, receiving information in the application windows, and so on. An OS, by its nature, receives all this information from various sources, which are not synchronized with each other. The mobile device usually has difficulty managing the time aspect of this information without timestamps.

For example, the mobile device receives notification that a window A of an application B is open, but the frame showing the window is not yet received. If the mobile device responds to the notification prematurely, the user experience will suffer, since the user does not see on the screen that the application has been launched. Therefore, timestamps of all or almost all data are used, to track when it was sent and/or received. The mobile device compares the timestamps to align the images with the actual events. According to the exemplary embodiment, events are time stamped by a transport protocol.

If the application hosting system notifies that the process has launched, the client receives the notification and the notification is transferred with the captured video frames. The time stamps are used on the client, so the user can either see or not see the remote window corresponding to a requested event based on the time stamp. In other words, if an application has closed, it is shown until a "good bye" message appears.

The exemplary embodiment synchronizes the local client and the remote server (or a cloud) and transfers a correct picture. The process slows down if the client sends key frame-related data. Instead, the frame metadata is sent to the mobile device for rendering the frame. The video frames that have not been transferred are not deleted from the server memory. The client receives data based on the channel width.

According to the exemplary embodiment, the codec is adopted for mobile systems. The codec is used for coding a server (application host) virtual desktop. The user preferably sees a clear (not blurred or artefacted) picture. The key frames are formed when significant changes of the picture occur. In general, some rules are usually applicable:

1. Generate key-frames in specified time range, e.g., once a second. This requirement relates to a fast rollback. The system should restore the frames the user wants to see in a fast manner. When the system should render several minutes' worth of video for 1 frame, this is obviously a problematic situation. Also, such a solution improves video stability in a simple manner.

2. When the difference between frames occupies more memory than a single frame and/or a large amount of computing resources are required for the difference calculation, a key frame is sent to receiver. This can be a problem, and is the most common case addressed by the exemplary embodiment.

The codec can react to input indicating changes of the windows on the server. Alternatively, rendering of a faded-out picture is delayed until it gets clear and stable. During this time, a user is shown and ad or sees empty windows filled with user data. As yet another alternative, the codec can have templates of portions of the key frames. The codec can get a template number and coordinates from the server. The templates can be of a rectangular shape, a frame or another configuration. The templates can be controls, buttons, control panels, desktop background, skins of programs, widgets, mouse pointers, and so on. A mouse pointer is a good artefact generator. The mouse pointer can be extracted from the image before applying the codec.

In one embodiment, user actions are used to inform the codec about displacement vector and a number of blocks displaced according to the vector. According to the exemplary embodiment, the scrolling is performed locally using a delay. In one embodiment, a large screen of the server virtual desktop is transferred to a mobile device in its entirety, while only a part of the window is displayed on the mobile device. A part of the codec (or a player) is represented by a large screen with screen center coordinates. The scrolling is performed locally and coordinates of the center are sent to the server, which changes the picture.

According to the exemplary embodiment, different areas of the screen are captured at a different frame rate. The codec takes it into consideration for encoding. The area borders are defined by a desktop or by some alternative mechanism, e.g., where different portions of the image relate to the different content. For example, the mouse pointer is used fast control over the content and should be refreshed frequently. Video content should preferably be refreshed with original video frequency. Still pictures and text may be moved on the screen without refreshing. Edited text area has small changing areas around a blinking cursor. In case of flash ads, the capture of the area is performed at the rendering frequency. The frequency data can be derived from a metadata attached to each frame. According to one embodiment, encoding with the increased frame frequency can be used only on a certain area (for example scrolling area). The rest of the picture is considered to be static by the codec.

The codec is given a notification about displacement. The codec can use initial swipe areas on a touchscreen device, instead of vector calculation in the codec. According to the exemplary embodiment, a virtual video card with a virtual frame buffer is used. The coding part of the codec may be embedded into a real or virtual video and then the encoded output can be used as a source of video stream transmitted to the mobile device or to the local desktop computer, which compresses the frame buffer in real time into a video stream and sends it to UDP protocol. Each application or image generation software can use an overlay buffer in the hardware video memory, with a language that describes how the overlays and the objects are placed on the screen. It is preferable to get the overlays in a separated manner and then code them separately. The overlays are detected by the host server. Since access to the memory of real video cards is not a simple task, a virtual video card or video card emulator with overlays can be implemented. Advantageously, a user has a native experience even using the 3D graphics.

Video cards can have the codec with a buffer for several frames. According to the exemplary embodiment, this buffer is increased by a few frames for a roll back. The roll back is used in coding by making an outdated frame to be current. In one embodiment, the frame buffer can be filled with data from the video capturing devices, such as webcams.

The codec rollback is implemented as follows. If N frames after the key frame have been coded but not yet sent, the frames cannot be dropped. These frames have to be sent to the decoder, so encoder and decoder contexts do not conflict. Thus, the encoder can roll back its context by M frames, so the encoded frames can be dropped. Therefore, the outdated frames are not sent and can be dropped. The context is rolled back and coded. Thus, only the new data is sent. In other words, with the encoder and decoder working symmetrically, the encoder, in the process of encoding, changes its context.

When the decoder decodes the image, the state of the decoder (its context) should be the same. The encoder, when encoding the subsequent frames, refers to the context that was received from working with the earlier images. The context itself is not normally transmitted, at least not explicitly. To decode a frame N, the context used for decode the (N−1)th frame is needed. To have the context for (N−1)th frame, it is necessary to sequentially decode the frames from 0 to N−1. This means that a frame usually cannot be simply dropped from the stream, since it would lead to loss of synchronization of the contexts between the encoder and the decoder. RPSI (Reference Picture Selection Interface) permits encoding a frame N using the context for a frame M, where K<M<N, and K is a frame previously encoded.

Using RPSI, the decoder, after decoding a frame N, informs the encoder, and, once the encoder receives this information, it starts encoding all the images using the context for encoding the frame N. However, this requires a feedback channel from the decoder to the encoder, and compression is reduced, since the greater N-M, the less the context of frame M can be used to encode frame N. The proposed approach implements a mechanism where the encoder stores multiple contexts simultaneously, where the contexts are available from encoding frames K . . . N.

When sending a frame, the encoder also includes information about the context used to generate the frame (or, optionally, the number of the frame). The decoder also stores several previous contexts, which permits the decoder to decode frames from the encoder even if a frame in a sequence is missing. The transport subsystem tells the encoder which frames have already been transmitted over a network (or at least sent into the network), after which the encoder starts encoding images using the contexts that it knows the decoder has. The advantages are that the feedback channel is less critical, and the value (N-M) will be smaller, since information about the change in context used for encoding will be received from the network interface subsystem, which is on the same machine as the encoder (unlike RPSI).

According to the exemplary embodiment, the user is not shown a picture from the video buffer until an application selected by the user is launched. The user selects an application on its mobile device and the command is sent to the remote server to open the selected application. The user screen displays a special image or message such as "wait for response" until the application is open and the user sees a remote desktop on his mobile device screen.

According to one exemplary embodiment, the user eye movement is detected by the mobile device camera and the encoding rules are set based on the user glance over the mobile device screen. For example, the areas of the screen the user looks at currently can be encoded with a higher quality (i.e., higher image frame frequency—resolution). This can be implemented by the mobile device or by the server depending on a complexity of the task. Same can be done with brightness of the displayed images. The codec is adopted for a mobile device and can process a metadata accompanying vide frames.

Figure 2A:
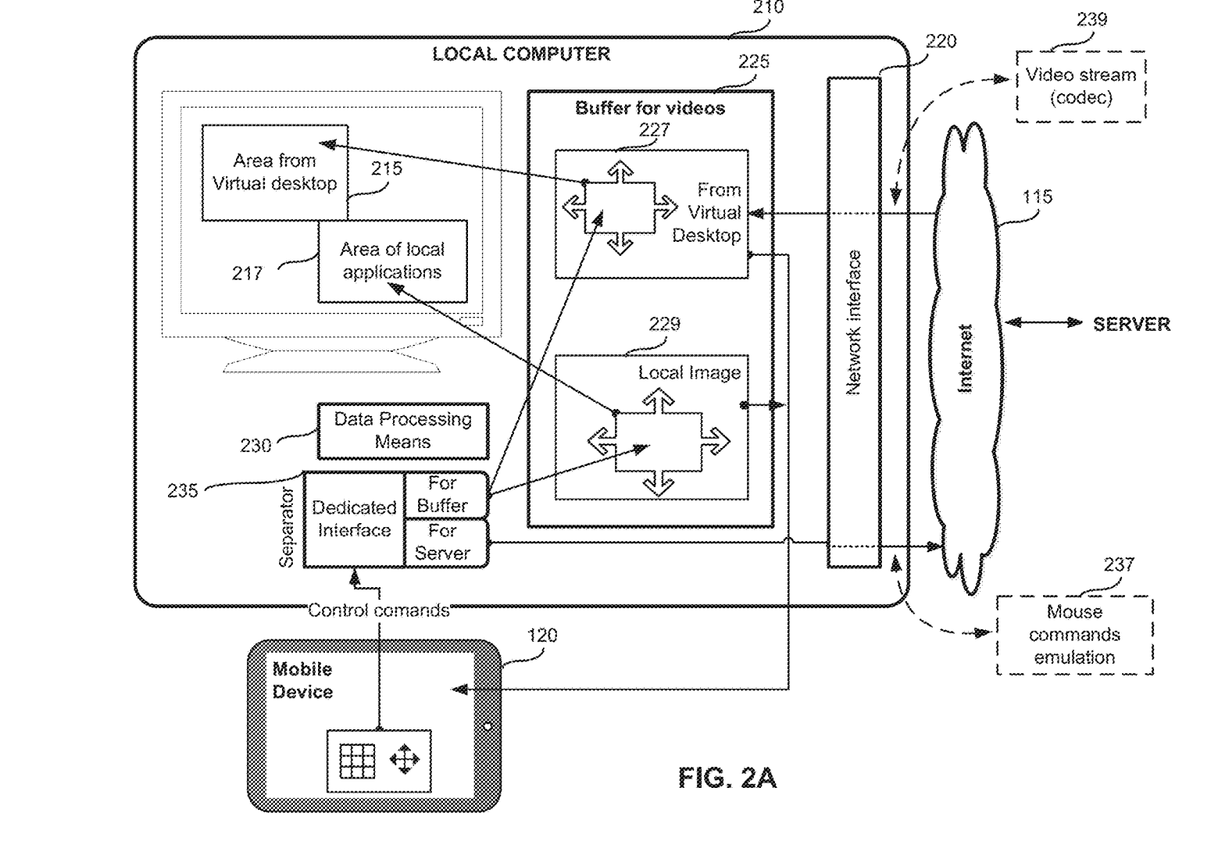
FIG. 2A illustrates detailed system architecture of a client side, in accordance with the exemplary embodiment.
Figure 2B:
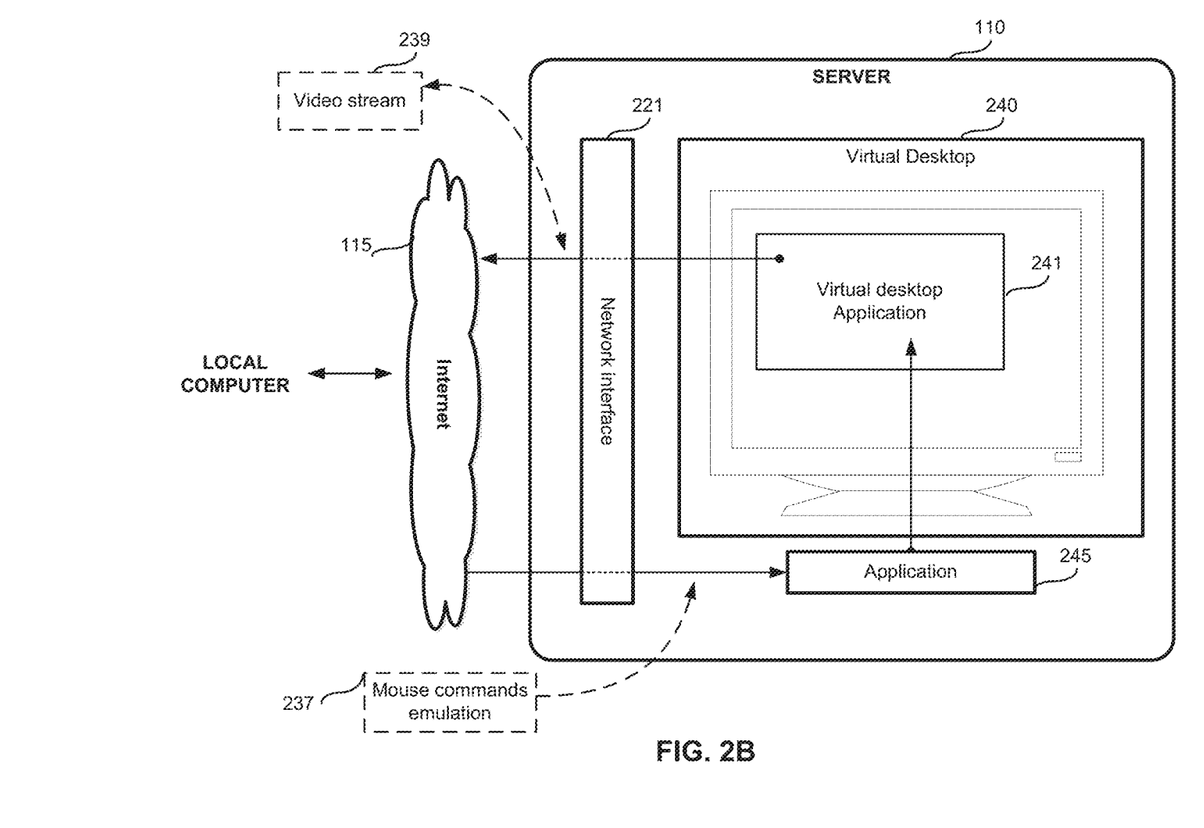
FIG. 2B illustrates detailed system architecture of a server side, in accordance with the exemplary embodiment.

FIG. 2A illustrates detailed system architecture of a client side, in accordance with the exemplary embodiment. FIG. 2B illustrates detailed system architecture of a server side, in accordance with the exemplary embodiment. As shown in FIG. 2B, a remote host 110 sends out a video stream 239 and corresponding data, and the remote host 110 receives commands 237 from the client 210 (FIG. 2A), and additional data (if necessary) used for processing the video stream 239. The client device (mobile device) 120 is used to render the video stream 239, and commands 237 from the mobile device 120 are sent to the host 110 or to the local computer 210. Some of the commands can be used to control the local computer 210 and/or to control the host 110, after the commands are processed by the local computer 210.

Some of the commands, after parsing, are translated without significant changes to the host 110 and are used to control the applications local applications 217 and server applications 245 and/or to control the video stream 239. The video buffer 225 (FIG. 2A), as one option, is an overlay structure, and can be used to form an image of the virtual desktop 240 of the remote host 110 (FIG. 2B) on the local device 210. The image of any overlay can be transmitted to the mobile device 120, depending on user selection. The use of the local computer 210 is optional, although its use can increase the speed of processing of the data and the speed of rendering the images.

As one option, the mobile device 120 can have a video and/or photo camera that capture an image of a flat surface or an image of user arms/hands, or styluses, and displaying them on the local computer 210, for example, in the form of a cursor. As one option, the CCD of the mobile device's camera can be integrated into the system, where the user can track the position of the finger or stylus by watching the local computer's monitor.

FIG. 2A shows a schematic of a local host computer 210, with the application launched thereon. The application is remotely controlled from the mobile device 120, or collectively by the mobile device 120 and the local host computer 210. The image from the real desktop 227 or a virtual host desktop 229, once transformed by the adaptive codec, is then transmitted to the mobile device 120 and, if available, local computer (areas 215 and 217). The data is transferred over the Internet 115 via respective network interfaces 220 and 221.

Figure 3:
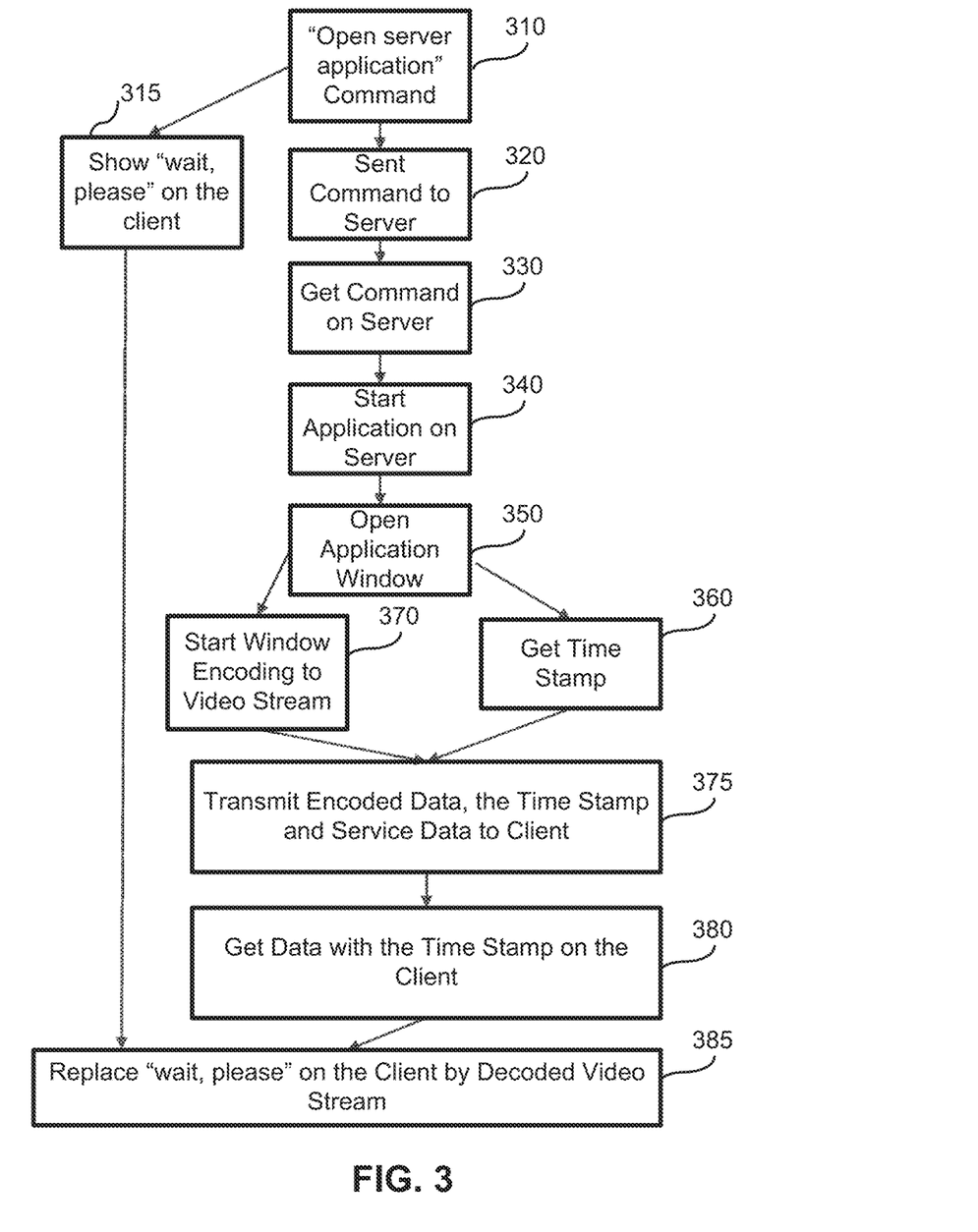
FIG. 3 illustrates a flow chart of a method, in accordance with the exemplary embodiment.

FIG. 3 illustrates a flow chart of the method, in accordance with the exemplary embodiment. An open server application command is generated by user by selecting an application on his mobile device in step 310. A message "please wait" is displayed on the client in step 315. The command is sent to the server in step 320. In step 330 the server gets the command and starts the application in step 340. The application window is opened in step 350.

The window is encoded into a video stream in step 370 and the time stamp is generated in step 360. Then, the server transmits the encoded application window data and the service data with the time stamp to the client in step 375. Service data is the metadata that is not strictly necessary, but whose transmission will improve the user experience as he views the images being rendered. Such service data can include frame points on the screen, description of graphical regions that need more detailed rendering, or more frequent refreshing, e.g., when decoding the frames. The service data is generated by the host service.

Also, instead of transmitting the image of the cursor, information about the cursor shape and location can be transmitted. Also, it can include information about a particular frame having specific settings, and there is no need to apply some settings on the local computer. Also, the service data can include the result of application function, requested by the user, which are needed in addition to the graphical images themselves, e.g., results of mathematical calculations. The client gets the encoded data and the time stamp in step 380. In step 385, the message "please wait" is replaced by the decoded video stream on the client. The decoded video stream represents a remote desktop image.

As will be appreciated, the proposed decoder can use inter-frames as key frames. Also, the encoder and the decoder can coordinate their actions for multi-stream encoding/decoding, where some regions of the image can have different resolutions, frame rate, different number of bits for color encoding, and so on. For example, text over a background can have 1-bit representation, while color of the font itself, or color of other fragments of the image can have higher resolution, including full 32 bit format, as well as 4 coordinate points specifying the rectangle of the area.

Figure 4:
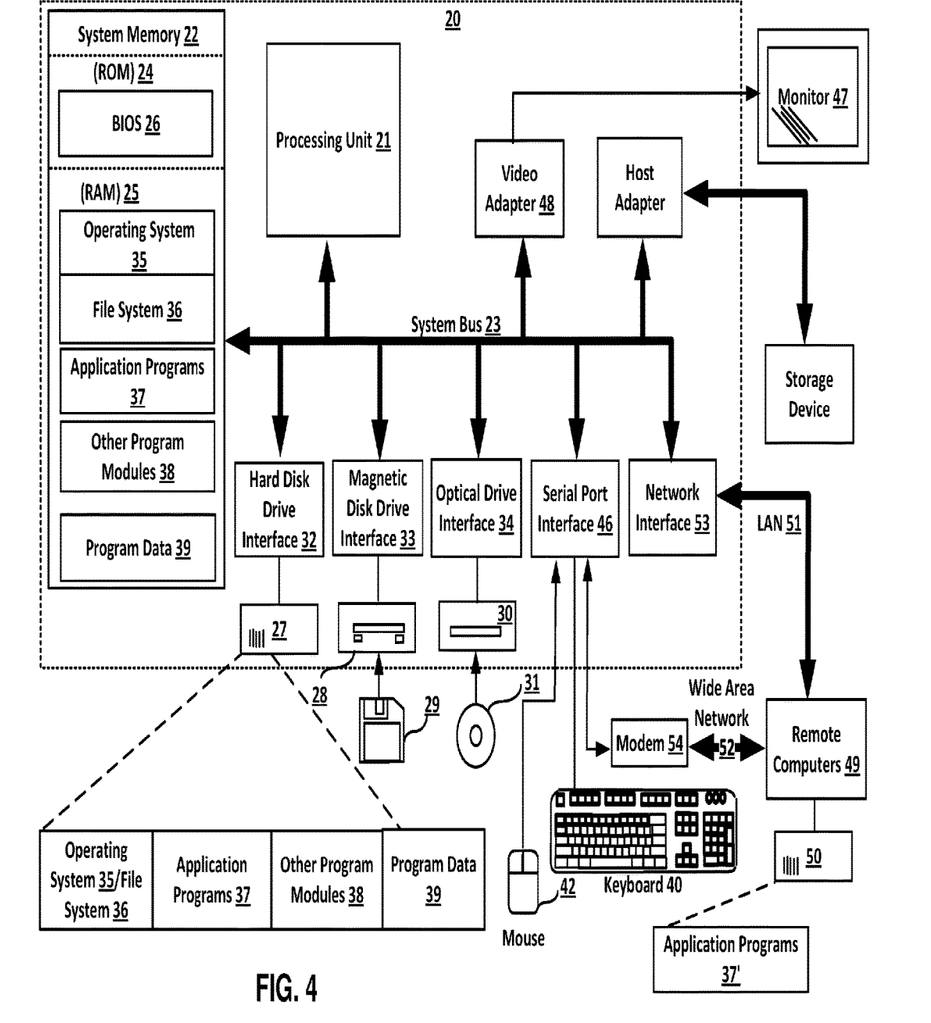
FIG. 4 illustrates a schematic diagram of an exemplary computer or server that can be used in the invention.

With reference to FIG. 4, an exemplary system for implementing the invention includes a general purpose computing device in the form of a host computer or server 110 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 110, such as during startup, is stored in ROM 24. The host computer 110 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computerreadable media provide non-volatile storage of computer readable instructions, data structures, program modules and other data for the host computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 110 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 110 may operate in a networked environment using logical connections to one or more remote computers 49. The remote computer (or computers) 49 may be another personal computer, a server, a router, a network PC, a peer device or other common network node, and typically includes many or all of the elements described above relative to the computer 110.

The computer 110 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 110 is connected to the local area network 51 through a network interface or adapter 53. When used in a WAN networking environment, the personal computer 110 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer 110, or portions thereof, may be stored in the remote memory storage device. It will be appreciated that the network connections shown are exemplary and other means of establishing a communications link between the computers may be used.

Figure 5:
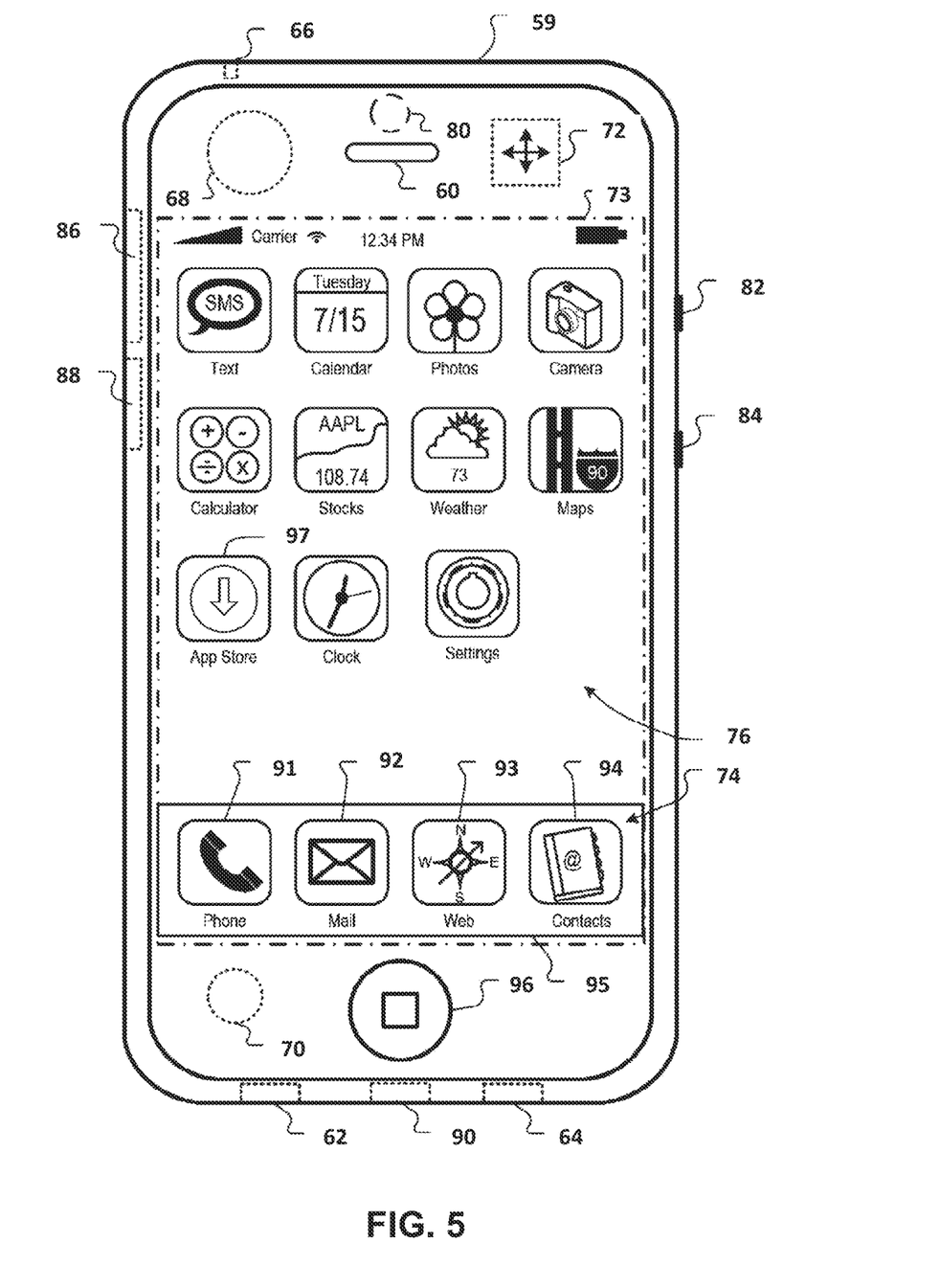
FIG. 5 is a block diagram of an exemplary mobile device that can be used in the invention.

FIG. 5 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94.

In some implementations, particular display objects 74, e.g., the phone object 91, the e-mail object 92, the Web object 93, and the media player object 94, can be displayed in a menu bar 95. In some implementations, device functionalities can be accessed from a toplevel graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 6:
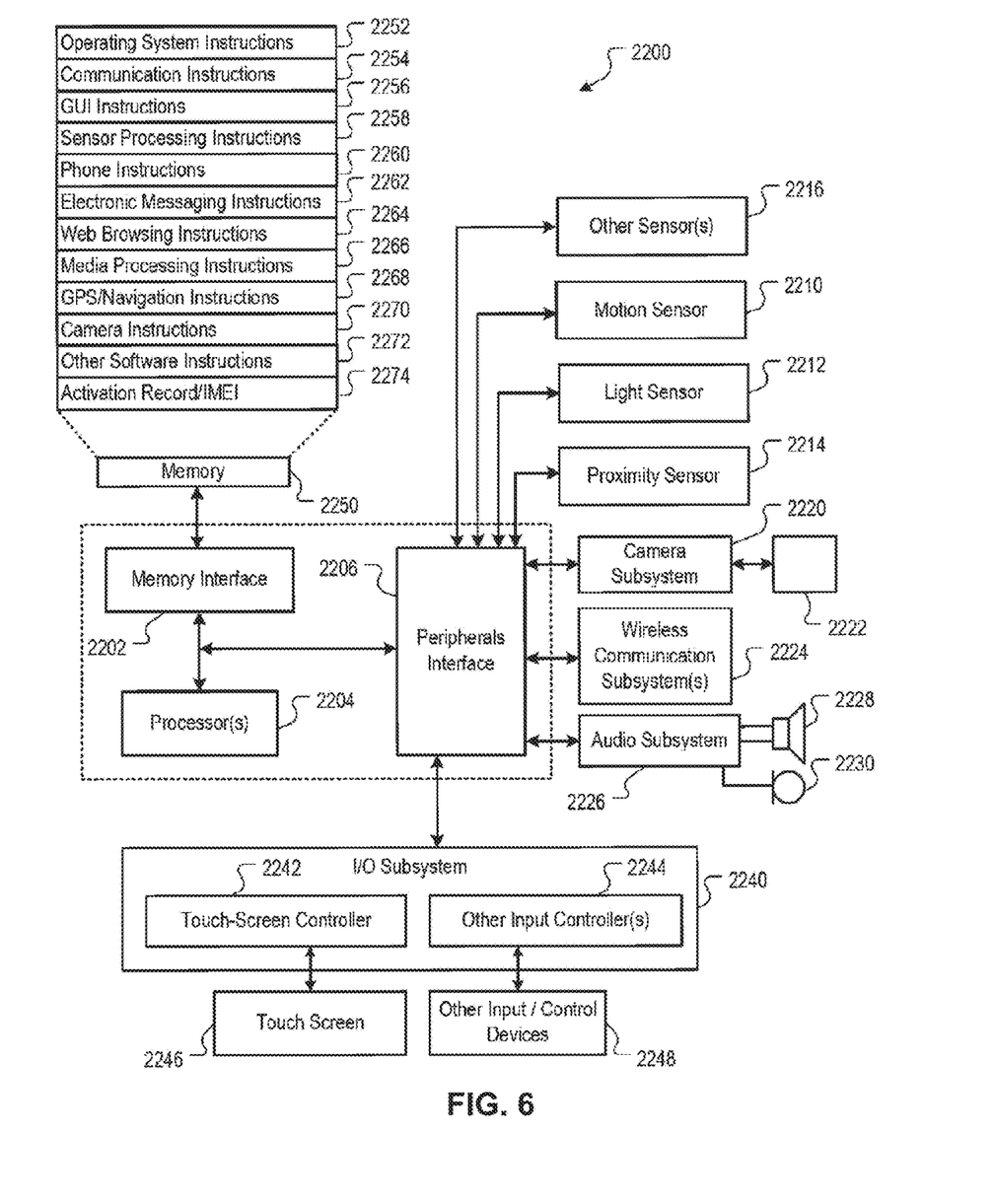
FIG. 6 is a block diagram of an exemplary implementation of the mobile device.

FIG. 6 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate.

For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices. An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described the different embodiments of a system and method, it should be apparent to those skilled in the art that certain advantages of the described method and apparatus have been achieved. In particular, it should be appreciated by those skilled in the art that the method and system provide for real times access to the applications residing on the remote server or a cloud by from a mobile device.

It should also be appreciated that various modifications, adaptations, and alternative embodiments thereof may be made within the scope and spirit of the present invention. The invention is further defined by the following claims.

What is claimed is:

1. A method comprising:
receiving, by a processing device of a client device, a video stream from a remote server, wherein the video stream comprises a graphical object generated by an application running on the remote server and controllable by a command issued by a mobile device communicatively coupled with the client device, the command to be executed by the remote server;
detecting whether the video stream comprises a result of an execution of the command with respect to the graphical object by the remote server;
responsive to the video stream not comprising the result, generating, by the processing device of the client device, a substitute graphical object to replace the graphical object in the video stream; and causing display of the substitute graphical object on the client device.

2. The method of claim 1, wherein the command comprises at least one of positioning an application window, sizing the application window, or switching to a different application window.

3. The method of claim 1, further comprising:
receiving the command from the mobile device; and
forwarding the command to the remote server.

4. The method of claim 1, further comprising:
receiving the command in an operating system-independent format; and
translating the command into a format corresponding to an operating system running on the client device.

5. The method of claim 1, wherein the video data stream further comprises data, embedded by a codec, indicating that the command has been executed on the remote server.

6. The method of claim 5, further comprising:
reading the data embedded by the codec in the video stream to detect whether the video stream comprises the result of the execution of the command by the remote server.

7. The method of claim 1, further comprising:
responsive to the video stream comprising the result, causing display of the graphical object on the client device.

8. A client device comprising:
a memory; and
a processing device coupled to the memory, the processing device configured to:
receive a video stream from a remote server, wherein the video stream comprises a graphical object generated by an application running on the remote server and controllable by a command issued by a mobile device communicatively coupled with the client device, the command to be executed by the remote server;
detect whether the video stream comprises a result of an execution of the command with respect to the graphical object by the remote server;
responsive to the video stream not comprising the result, generating a substitute graphical object to replace the graphical object in the video stream; and
cause display of the substitute graphical object on the client device.

9. The client device of claim 8, wherein the command comprises at least one of selecting an application, changing a display brightness, or setting a display resolution.

10. The client device of claim 8, wherein the processing device is further configured to:
receive the command from the mobile device; and
forward the command to the remote server.

11. The client device of claim 8, wherein the processing device is further configured to:
receive the command in an operating system-independent format; and
translate the command into a format corresponding to an operating system running on the client device.

12. The client device of claim 8, wherein the video data stream further comprises data, embedded by a codec, indicating that the command has been executed on the remote server.

13. The client device of claim 12, wherein the processing device is further configured to:
read the data embedded by the codec in the video stream to detect whether the video stream comprises the result of the execution of the command by the remote server.

14. The client device of claim 8, wherein the processing device is further configured to:
responsive to the video stream comprising the result, cause display of the graphical object on the client device.

15. A non-transitory computer-readable storage medium storing instructions, which when executed by a processing device of a client device, cause the processing device to perform operations comprising:
receiving, by the processing device, a video stream from a remote server, wherein the video stream comprises a graphical object generated by an application running on the remote server and controllable by a command issued by a mobile device communicatively coupled with the client device, the command to be executed by the remote server;
detecting whether the video stream comprises a result of an execution of the command with respect to the graphical object by the remote server;
responsive to the video stream not comprising the result, generating, by the processing device, a substitute graphical object to replace the graphical object in the video stream; and
causing display of the substitute graphical object on the client device.

16. The non-transitory computer-readable storage medium of claim 15, wherein the operations further comprise:
receiving the command from the mobile device; and
forwarding the command to the remote server.

17. The non-transitory computer-readable storage medium of claim 15, wherein the operations further comprise:
receiving the command in an operating system-independent format; and
translating the command into a format corresponding to an operating system running on the client device.

18. The non-transitory computer-readable storage medium of claim 15, wherein the video data stream further comprises data, embedded by a codec, indicating that the command has been executed on the remote server.

19. The non-transitory computer-readable storage medium of claim 18, further comprising:
reading the data embedded by the codec in the video stream to detect whether the video stream comprises the result of the execution of the command by the remote server.

20. The non-transitory computer-readable storage medium of claim 15, wherein the operations further comprise:
responsive to the video stream comprising the result, causing display of the graphical object on the client device.

* * * * *